Patented Oct. 17, 1950

2,525,779

UNITED STATES PATENT OFFICE 2,525,779

ALKANE BIS QUATERNARY AMMONIUM SALTS

Peter L. de Benneville, Philadelphia, Pa., and Richard W. Gormly, Collingswood, N. J., assignors to Rohm & Haas Company, Philadelphia, Pa., a corporation of Delaware No Drawing. Application June 29, 1949, Serial No. 102,146

4 Claims. (Cl. 260—567.6)

This invention relates to N,N,N',N'-tetramethyl-N,N' - bisalkylbenzyl-N,N' - alkylene bis-(ammonium halides) and to a method for their preparation. These compounds are defined by the formula

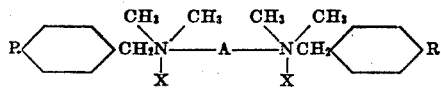

wherein R is an alkyl group of seven to nine carbon atoms, A is an alkylene chain of two to four carbon atoms, and X is chlorine or bromine. The compounds thus defined have powerful bactericidal and fungicidal actions.

Bis quaternary ammonium salts in which the two nitrogen atoms are separated by an alkylene group and in which the nitrogen atoms carry long chained alkyl groups have been reported. These compounds have about the same order of bactericidal efficiency as mono quaternary salts of comparable constitution in some cases, and in others, less. As compared with either of these types of quaternaries, the compounds of the present invention are markedly more effective and efficient in controlling bacteria and fungi.

The bis quaternary ammonium halides of this invention are prepared by reacting together in a molar ratio of about one to two a bis(dimethylamino) alkane, the alkane group having a chain of two to four carbon atoms between nitrogen atoms, and an alkylbenzylhalide in which the alkyl group has seven to nine carbon atoms. The two reactants may be directly combined or they may be reacted by addition in the presence of an inert organic solvent such as benzene, toluene, xylene, isopropyl alcohol, butyl alcohol, isopropyl ether, a nitroparaffin such as nitromethane, acetonitrile, formamide, or the like. Temperatures between 20° C. and 140° C. are generally useful. When solvents are used, they may be removed by distillation at normal or reduced pressures. In some cases the bis quaternary ammonium salts can be precipitated or crystallized from the solvents used.

In an alternative method for the preparation of tetramethyl bis alkylbenzyl alkylene bis(ammonium halides) there are reacted by addition one molar proportion of an alkylene halide having two to four carbon atoms between nitrogen atoms and the tertiary amine,

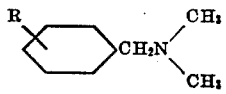

where R is an alkyl group of seven to nine carbon atoms. The conditions for effecting this reaction are essentially the same as described above for the reaction of an alkylbenzyl halide and a tetramethylalkylenediamine.

Preparation of bis(dimethylamino)alkanes follows known procedures of reacting a dihaloalkane with dimethylamine. There are thus available 1,2-bis(dimethylamino)ethane, 1,3-bis(dimethylamino)propane, and 1,4-bis(dimethylamino)butane, 1,2-bis(dimethylamino)propane, 1,2-bis(dimethylamino)butane, and 1,3-bis(dimethylamino)butane.

Alkylbenzyl halides having alkyl groups of the required size are prepared in accordance with the method described in our Application Serial No. 28,274, filed May 20, 1948. As there described, alkylbenzyl halides are obtained by halomethylating an alkylbenzene or an alkyltoluene by reaction with anhydrous formaldehyde and hydrogen chloride or bromide in the presence of a catalyst mixture formed from one molecular proportion of zinc chloride and 1.5 to 8 molecular proportions of an aliphatic monocarboxylic acid of one to three carbon atoms, such as formic, acetic, chloracetic, or propionic. An acid anhydride may be used in place of those acids or in admixture therewith. Formaldehyde may be used as a gas or as a revertible polymer. The equivalent of formaldehyde and hydrogen bromide or hydrogen chloride is obtained by use of bromomethyl ether or chloromethyl ether, which are conveniently prepared by known methods and reacted with an alkylbenzene of the required size.

For halomethylation of alkylbenzenes or alkyltoluenes having alkyl groups of seven to nine carbon atoms from one to 2.5 molecular equivalents of formaldehyde together with 0.75 to 2.5 molecular proportions of zinc chloride taken with 1.5 to 8 molecular proportions of aliphatic monocarboxylic acid per mole of zinc chloride are used per mole of an alkylbenzene or alkyltoluene. These components are mixed and stirred at temperatures of 50° to 100° C. and hydrogen chloride or bromide is passed in. Alternatively, the alkylbenzene and catalyst mixture are stirred together and a halomethyl ether added with observance of the defined proportions. With a heptyl benzene it is advisable for best yields to work at the lower end of the temperature range with an upper proportion of monocarboxylic acid within the designated range. Yields improve with increasing size of alkyl group. By this procedure good yields of alkylbenzyl halides are obtained with introduction almost entirely of a single halomethyl group and without formation of troublesome resinous products.

For preparation of the alkylbenzyl halides there are required alkylbenzenes or alkyltoluenes of the proper size. The exact form of the alkyl group is not important, nor is the orientation of this group relative to the halomethyl group or to the methyl group of an alkyltoluene of particular significance. The alkyl group may be of straight or branched chain structure and may be primary, secondary or tertiary. This group may be introduced by known methods. For example, an acyl halide may be used to introduce an acyl group into the phenyl ring, which is then reduced. Olefinic hydrocarbons of the required size may be reacted with benzene or toluene in the presence of an acidic catalyst.

The useful starting alkylbenzenes are heptylbenzene, octylbenzene, nonylbenzene, heptyltoluene, octyltoluene, and nonyltoluene in their various isomeric forms. Typical of these are (1-methylhexyl) benzene, (1-ethylpentyl) benzene, (1,3-dimethyl-1-propylbutyl) benzene, (1-methylheptyl) benzene, (2-ethylhexyl) benzene, (3,5,5-trimethylhexyl) benzene, o-, m-, or p-octyltoluene, p-(1-methylheptyl) toluene, p-(1-ethylpentyl) toluene, (1,3,3-trimethylbutyl) benzene, and the like. Mixtures of such hydrocarbons may be used as well as individual alkylbenzenes or alkyltoluenes.

Typical preparations of alkylbenzyl halides follow. Parts shown are by weight.

*Example 1.*—To a mixture of 70 parts of 2-ethylhexylbenzene (prepared according to the method of Sulzbacher and Bergmann, J. Org. Chem. 13,303 (1948), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

*Example 2.*—To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

*Example 3.*—Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

*Example 4.*—To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

*Example 5.*—Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

*Example 6.*—A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

*Example 7.*—To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174°C./2 mm. there was obtained a fraction corresponding in composition to octylbenzyl bromide. It contained by analysis 28.8% of bromine. Theory for this product is 28.3%.

The following examples illustrate the reaction of alkylbenzyl halides and tetramethyl diaminoalkanes and also af alkylbenzyldimethylamines and alkylene dihalides to form the bis quaternary ammonium salts of this invention. Parts shown are by weight.

*Example 8.*—There were mixed 135 parts of heptylbenzyl chloride, 43.2 parts of 1,4-bis(dimethylamino) butane, and 250 parts of benzene. The mixture was heated under reflux for three hours and cooled. A colorless product precipitated. It was filtered off to yield 150 parts of a product which corresponded in composition to that of N,N,N',N'-tetramethyl-N,N'-bis(heptylbenzyl)-N,N'-1,4-butylene-bis (ammonium chloride).

This product has a phenol coefficient of 350 against *Salmonella typhosa* and 750 against *Staphylococcus aureus*.

The above preparation was repeated with a mixture of p-(1-ethylpentyl) benzyl chloride and p-(1-methylhexyl) benzyl chloride. A similar product was obtained. It was found to have phenol coefficients of 330 and 710 against *Salmonella typhosa* and *Staphylococcus aureus* respectively.

*Example 9.*—A mixture of 123 parts of octylbenzyldimethylamine, 47 parts of ethylene dibromide, and 250 parts of benzene was heated under reflux for 20 hours. The benzene was distilled from the reaction mixture and the residue stripped by heating at low pressure. A dark colored, water-soluble, waxy solid was obtained as a residue. It consisted chiefly of the desired bis(ammonium salt), N,N,N',N'-tetramethyl-N,N' - bis(octylbenzyl) - N,N' - ethylene-1,2-bis (ammonium bromide). It had an ionizable bromine content of 19.1% (theory is 23.3%). Against *Salmonella typhosa* the product as obtained had a phenol coefficient of 110 and against *Staphylococcus aureus* one of 665.

*Example 10.*—A mixture of 40 parts of trimethylene dibromide, 120 parts of p-(1-methylheptyl) benzyldimethylamine, and 250 parts of benzene was heated under reflux for 17 hours. The reaction mixture was stripped of benzene by heating under reduced pressure on a steam bath. There was obtained a waxy solid which consisted principally of N,N,N',N'-tetramethyl-N,N' - bis(p - 1 - methylheptylbenzyl) - 1,3 - trimethylene-bis(ammonium bromide). The residue had an ionizable bromine content of 19.1% (theory is 23.0%). Phenol coefficients were determined of 555 and 570 against *Salmonella typhosa* and *Staphylococcus aureus* respectively.

*Example 11.*—A mixture of 72 parts of 1,4-bis(dimethylamino)-butane, 238 parts of p-α,α,γ,γ-tetramethylbutylbenzyl chloride, and 350 parts of benzene was heated for three hours under reflux. The benzene was distilled off under reduced pressure to leave 310 parts of a light yellow, crystalline solid which had an ionizable chlorine content of 10.4%. It corresponded in composition to tetramethyl tert.-octylbenzyl butylene bis(ammonium chloride), the theoretical ionizable chlorine content of which is 11.4%.

The phenol coefficients of this product are 610 and 1300 against *Salmonella typhosa* and *Staphylococcus aureus* respectively. It prevents germination of spores of *Sclerotinia fructicola* and *Macrosporium sarcinaeforme* at concentrations of 0.001%.

*Example 12.*—A mixture of 50 parts of 1,4-bis-dimethylamino)-butane, 177 parts of p-(1,2,4,4-tetramethylpentyl) benzyl chloride, and 300 parts of benzene was heated under reflux for four hours. When the reaction mixture was allowed to cool, a crystalline product separated. It was filtered off and dried to yield 190 parts of N,N,N',N' - tetramethyl - N,N' - bis(tetramethylpentylbenzyl)-1,4-butylene bis (ammonium chloride). The ionizable chlorine content was determined as 10.6% (theory 11.0%). Phenol coefficients of 665 and 1150 were found for this product against *Salmonella typhosa* and *Staphylococcus aureus* respectively.

In a similar manner 80 parts of decylbenzyl chloride, 216 parts of 1,4-bis-(dimethylamino) butane, 250 parts of benzene were heated to yield 55 parts of solid tetramethyl bis (decylbenzyl) butylene bis(ammonium chloride). This product had a phenol coefficient of 57 against *Staphylococcus aureus*.

*Example 13.*—There were mixed 72 parts of 1,4-bis-dimethylamino) butane, 283 parts of p-2-octylbenzyl bromide, and 400 parts of toluene. The mixture was heated under reflux for three hours and left standing overnight. A light colored crystalline product had formed, was separated by filtration, and was dried. It corresponded in composition to N,N,N',N'-tetramethyl - N,N' - bis (octylbenzyl) - butylene - 1,4-bis(ammonium bromide). It has phenol coefficients of 675 and 1250 against *Salmonella typhosa* and *Staphylococcus aureus* respectively.

The bis(alkylbenzyl) alkylene bis(ammonium halides) having the structures shown above with alkyl groups of seven to nine carbon atoms, the halogen having an atomic weight between 35 and 80, are peculiarly powerful in their bacteriostatic, bactericidal, and fungicidal actions. The above halides may be converted to quaternary salts having anions other than chlorine and bromine by metathesis. Thus, pentachlorophenates, nitrophenates, acetates, sulfates, and the like may be prepared.

Preparation of alkylbenzyldimethylamines is illustrated by the following examples.

*Example 14.*—(a) To a solution of 8 parts of sodium hydroxide in 30 parts of water there was added 22.5 parts of an aqueous 50% dimethyl amine solution. The reaction vessel in which this mixture was formed carried a refluxing system cooled with dry ice and acetone. To the mixture there was added 22.5 parts of heptylbenzyl chloride. The mixture was heated to give gentle refluxing and dimethylamine gas was slowly passed in during a period of three hours. The reaction mixture was allowed to form layers which were separated. The product layer was washed with water until neutral to litmus and heated under reduced pressure. There was obtained 20 parts of a light yellow oil which had the proper analysis for heptylbenzyldimethylamine.

(b) The procedure of Example 14 (a) was followed with substitution of 25.3 parts of nonyl benzyl chloride in place of the 22.5 parts of heptylbenzyl chloride. There was obtained 18 parts of product which corresponded by nitrogen analysis to nonylbenzyldimethylamine.

The procedure was repeated with p-1,3,5,5-tetramethylpentylbenzyl chloride and a similar product obtained, p-(1,3,5,5-tetramethylpentyl)-benzyldimethylamine.

(c) The procedure of Example 14 (a) was followed with use of 23.8 parts of p-2-octylbenzyl chloride as the alkylbenzyl halide. The product obtained was (2-octylbenzyl)dimethylamine.

We claim:

1. As new chemical substances, compounds of the formula

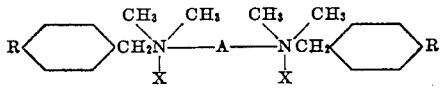

wherein X is a halogen of atomic weight between 35 and 80, A is an alkylene group having a chain of two to four carbon atoms, and R is an alkyl group of seven to nine carbon atoms.

2. As a new chemical compound, N,N,N',N'-tetramethyl - N,N' - bis(octylbenzyl) - butylene-1,4-bis(ammonium chloride).

3. As a new chemical compound, N,N,N',N'-tetramethyl - N,N' - bis(octylbenzyl) - butylene-1,4-bis(ammonium bromide).

4. As a new chemical compound, N,N',N',N'-tetramethyl - N,N' - bis(nonylbenzyl) - butylene - 1,4-bis(ammonium chloride).

PETER L. DE BENNEVILLE.
RICHARD W. GORMLY.

No references cited.